Jan. 27, 1931.    O. S. SELLS    1,790,115
APPARATUS FOR TREATING FOOD PRODUCTS
Filed July 25, 1924    3 Sheets-Sheet 2

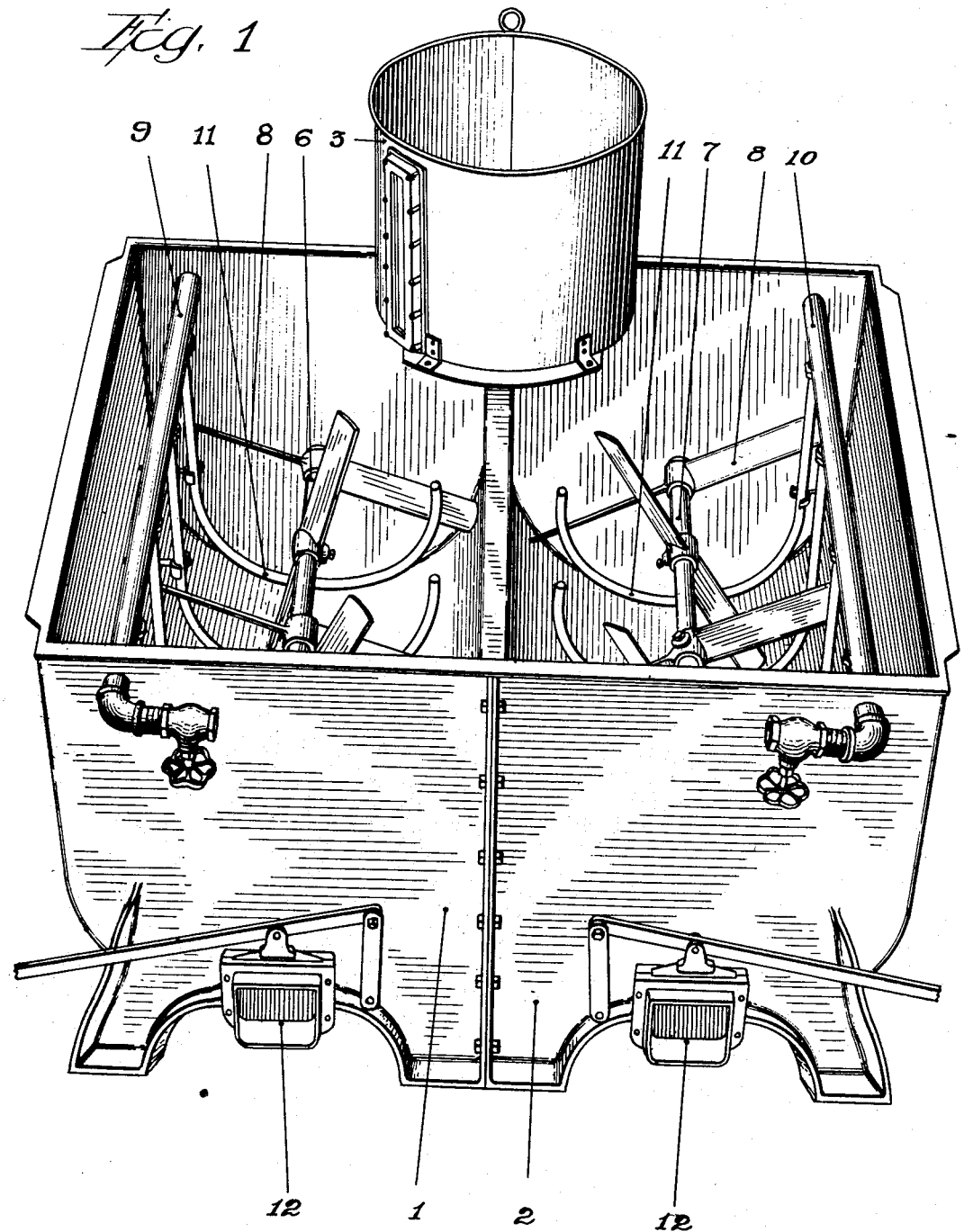

Inventor:
Ogden S. Sells.
T. J. Graham
Atty.

Jan. 27, 1931. O. S. SELLS 1,790,115
APPARATUS FOR TREATING FOOD PRODUCTS
Filed July 25, 1924 3 Sheets-Sheet 3
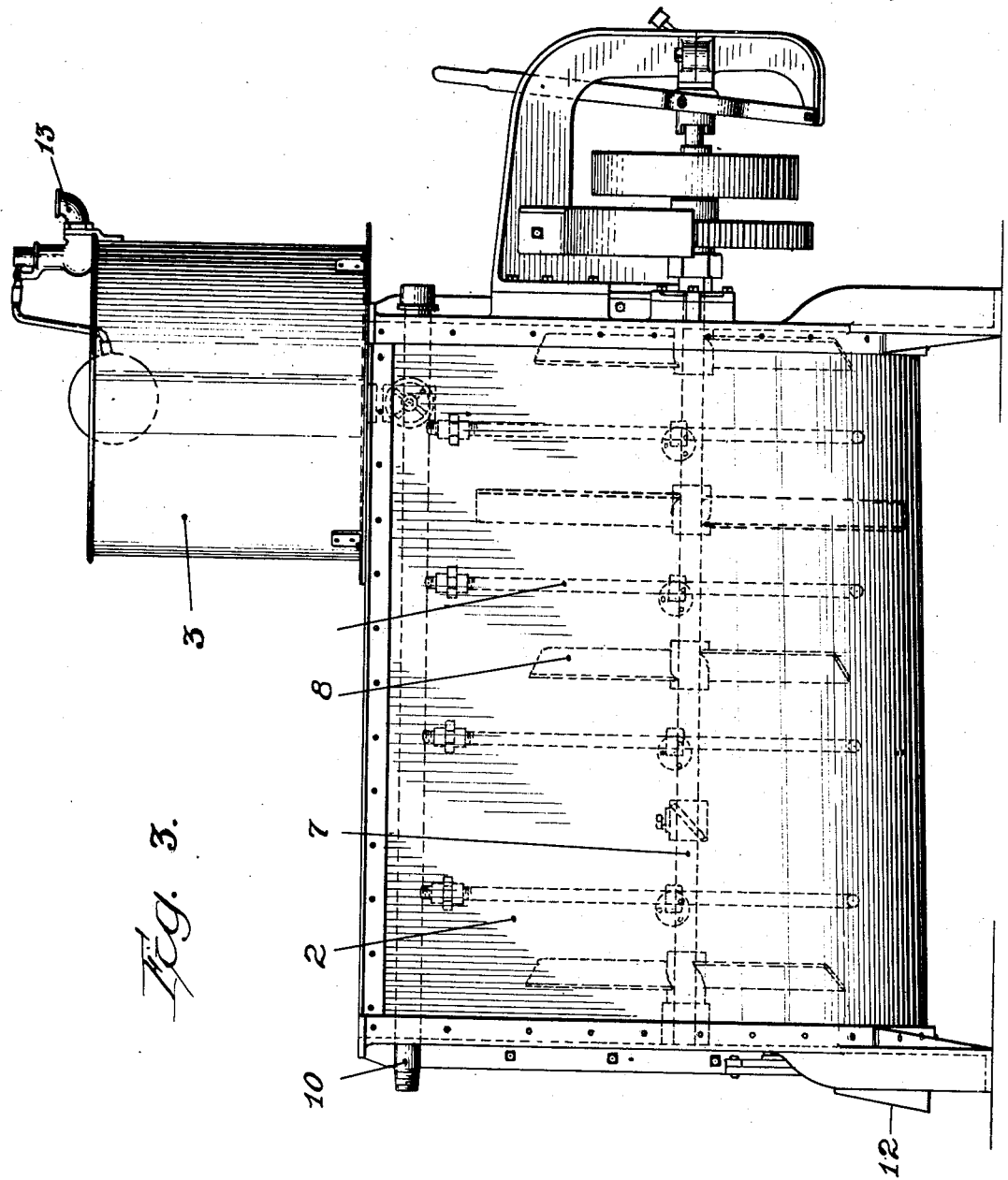

Patented Jan. 27, 1931

1,790,115

UNITED STATES PATENT OFFICE

OGDEN S. SELLS, OF HOOPESTON, ILLINOIS, ASSIGNOR TO SPRAGUE-SELLS CORPORATION, OF HOOPESTON, ILLINOIS

APPARATUS FOR TREATING FOOD PRODUCTS

Application filed July 25, 1924. Serial No. 728,195.

This invention refers to the art of treating food products preparatory to placing in permanent containers, and is particularly adapted to handling, and treating green corn just after it is cut from the cob, as well as hominy, meats and such other food products as require some treatment before sealing in the cans.

In the process of canning green corn, certain preliminary treatments are necessary and desirable in order to have the corn enter the cans in the most attractive and palatable condition, as well as having it treated so that subsequent cooking and processing will be carried on in a manner to produce proper preservation of the product after placing in the cans and to reach the consumer in as near perfect condition as possible.

This preliminary treatment constitutes mixing the freshly cut green corn with a suitable brine or syrup and subjecting the mixture to heat and agitation.

The object of this treatment is to thoroughly mix the corn and syrup, preferably by moving paddles or agitators that will produce a vigorous stirring and beating action to assist in flowing the starches from the kernels, and by applying heat during the stirring to expand the natural gases and air contained in the kernels to expel them therefrom as well as to heat the mass to a temperature that will produce a sufficient vacuum in the filled cans after processing and cooling.

A number of different types of machines have been devised for this purpose, but none of them have fulfilled the foregoing conditions in an entirely satisfactory manner.

Most of these mixers and agitators have been provided with vertical tanks having paddles or agitators moving in a horizontal plane and their action has been to cut through the mass of corn and syrup rather than stir and beat it.

Heat is generally supplied through the admission and projection of jets of steam into the mass while it is being agitated. The design and general operation of these mixers has required that the tank have its full charge of cold corn before the steam is turned on, so that the jets met the resistance of the mass and were thereby confined and prevented from blowing out and splattering corn over and about the machine.

Difficulty has also been experienced to thoroughly heat and properly mix the cold mass in the desired minimum of time when the heat is applied to so large a quantity, also, the natural air and gas in the kernels is not nearly so thoroughly expelled under these conditions as if the heat or steam could be applied as soon as the cold corn and syrup began to enter the mixing tank.

It is therefore a principal object of my invention to provide a machine in which the agitator paddles or beaters are mounted on a horizontally placed shaft and are moved thereby in vertical planes, so that the mass is beaten down when the paddles enter the mass, and is lifted and dropped when they leave the mass.

It is a further object of the invention to place the paddles or agitators in such spaced relation, and to have their faces lying in such alternate angular directions as to cause a to and fro movement of the mass of corn at the same time that beaters are passing laterally through the mass, which combined action greatly facilitates perfect mixing of the syrup through the mass and aids very materially in forcing the air and gas out of the kernels.

A still further object of the invention resides in placing steam pipes in the tank, curved or shaped to follow the contour of the bottom of the tank and spaced therefrom, with holes arranged along the under sides thereof directed toward the tank bottom so the steam jets will be projected toward the bottom and thus have no tendency to blow out the open top. This arrangement permits of turning on the steam as soon as cold corn and syrup begin to enter the tank and greatly facilitates the heating and mixing operation, and begins to expel the occluded air and gas before the mass gains depth or begins to thicken from the partial cooking produced by the live steam entering the mass. This arrangement of steam jets also permits using steam at a pressure of 40# or more as may be desired, thus enabling a quick generation of heat as the mass grows in depth and consistency. All of the steam being directed toward the bottom of the tank there is no danger of it blowing out of the mass and carrying the mixture along to mess up things.

Another object of the invention resides in making a multiple unit with tanks arranged side by side; each having an independent set of steam pipes and agitators so that when one tank of material has been treated and is being emptied into the filling machine the other tank can be receiving a charge of corn and syrup and be receiving its treatment so as to be completed by the time the other tank is emptied. This alternate filling, treating and emptying makes practically a continuous process, which is necessary where the filling machine is running continuously.

With such objects in view as well as other advantages inherent in the invention, the novel structural peculiarities, novel organization of elements and the separate and collective operations involved in carrying out the recited objects of my invention, which will be made the subject matter of claims hereto appended, I wish it to be understood that the several necessary elements and combinations constituting the same may be varied in their proportions, placement and general arrangement without departing from the scope and nature of the invention.

In carrying out the objects of my invention in a concrete form or machine, further objects, advantages and improvements have been evolved than have been recited, and in order to make the invention more clearly understood there are shown, somewhat diagrammatically, in the accompanying drawings, means and mechanism embodying the preferred structural arrangement and the preferred disposition of the different parts and combinations, without limiting the claims to the details of construction shown, in which I have simply illustrated one way of embodying the creative part or conception of the invention in a concrete form or machine. The described devices are simply embodiments of the invention which other structures might also employ and some of the parts or combinations of parts may be used without the others in different types of such machines without departure from the purview of my invention and I regard myself as entitlted to such variations from the shown and described devices as fall within the scope and meaning of the claims hereto appended.

The drawings accompanying this application for patent have been made in such a manner that will best illustrate the application of the invention to an operative machine; they are more or less diagrammatic in their showing; are not necessarily drawn to scale and some parts may be more or less exaggerated in their relative proportions so as to better illustrate the operation of the various elements, neither is the showing in the drawings necessarily representative of the best engineering practices in constructing apparatus of this nature.

Reference now being had to the drawings:

Fig. 1 is a perspective of a machine embodying the invention and clearly shows the placement of the horizontal agitator shafts; the placement and facial inclination of the agitators or beaters; the general arrangement of the steam pipes; a syrup tank located in a position to supply syrup to each of the mixing tanks and the manner in which the unit is built up in multiple section for alternate operation to supply a practically continuous flow of mixed and treated material to the next operative machine in the series.

Fig. 2 is an end view of the machine with a portion of the casing broken away to better show the interior and the relation of the various operative elements.

Fig. 3 is a side elevation and clearly shows the drive mechanism and the spacing of the agitators and the steam pipes located in the mixing tanks.

The numerals 1 and 2 represent the two tank units arranged side by side, and the numeral 3 represents the syrup or brine tank arranged over the two tanks in such a manner that it may supply syrup to either tank through the medium of the valves 4 and 5, Fig. 2. 6 and 7 represent the horizontal shafts on which are mounted the agitator or beater blades 8. 9 and 10 represent the steam pipes entering the tanks 1 and 2 and 11 represents the curved distribution pipes that follow the contour of the tank bottoms and project the steam into the mass of corn and syrup. 12 represents the discharge gates out of which the mixed and treated material is passed into a filling or any other type of machine for the next step in the process of handling. The horizontal shafts 7 are given rotation through the medium of the gearing shown on Figs. 2 and 3 and need no special description, power being applied through a belt drive over the clutch pulley shown in Fig. 3.

The syrup or brine tank 3 is provided with an automatic float valve whereby the syrup delivered through the pipe 13 is maintained at a practically constant level. Suitable valves on the ends of the steam pipes 9 provide means for manually controlling the admission of the steam to the tanks in such quantity as may be desired.

The operation of the machine would be somewhat along the following lines, when handling green corn, but may be changed very materially in handling other food products or materials.

As a general arrangement the machines known as corn cutters which cut the kernels from the cobs, are placed on an elevation above the mixing machine forming the subject matter of this application, or else are placed on the floor above and the corn as cut drops into a gravity conveyor or any other suitable means of conveyance and is thereby carried down into the mixers direct or into a bin where it may be discharged into the mixers at such intervals as the operator desires.

The syrup or brine is prepared in suitable tanks and conveyed down to the syrup tank on the top of the mixer by means of suitable piping, and the syrup tank is kept filled through the automatic action of the float valve. The hand operated valves 4 and 5 serving as means whereby the operator may admit the desired amount of syrup into the mixing tanks to suit the conditions and requirements of the material being handled.

We will suppose that the tank 1 has received a charge of green corn and the desired amount of syrup and has been mixed and agitated as has been described, and that the corn is properly heated and is ready to pass on to the filling or other machine in the line for performing the next operation. The operator will open the gate 12 and the action of the agitator blades due to the inclination of their faces will be to force the mixed product through the opening permitting it to pass to the next machine or for further treatment in the process.

As soon, or just prior to, discharging the first mixed batch the operator will admit cold green corn and syrup to the other tank and turn on the steam so that as the corn and syrup enter the tank they immediately come in contact with the steam jets projected toward the bottom of the tank through the holes 11a in the under sides of the bent pipes 11.

The agitator blades 8 are moving all of this time so that the treatment of the corn commences and progresses continuously from the time it begins entering the tank until the treatment is completed, when this tank will be discharged into the filling machine or other desired location and the first tank placed into duty and the process repeated ad libitum.

It will be noted by reference to Fig. 1 that the double unit machine is composed of two separate tanks bolted together. When the machine is to be used for other types of product, whether used for food or otherwise, and only one of the tanks is necessary they are supplied separately for the purpose. This of course is a structural convenience and advantage.

The method of treating corn in the foregoing described manner results in a considerable improvement in the ultimate product that is placed and sealed in the cans.

Unless the occluded air and gas carried naturally by the kernels, is fully and completely expelled during this preliminary treatment, it operates to produce what are called slack filled cans.

Merely heating the mass is not sufficient for best results. As soon as heat is applied to a mass of green corn and the syrup, a partial cooking immediately takes place, and the mass is slowly thickened and becomes of a creamy consistency. This thickened mass will entrap and hold the air and gas that the heat may expel from the kernels so that it finally gets into the cans notwithstanding it has been expelled from the kernels by expansion. When this air and gas goes into the can with the thickened corn it occupies a certain space while in a highly expanded condition. The cans may be completely filled with this kind of treated corn and after final processing and cooling the air and gas will be forced out of the mass by natural contraction and shrinkage and will accumulate in the top of the can where an empty space of as much as three quarters of an inch will be produced under certain conditions.

The packer has no intention of placing slack filled cans on the market, but heretofore he has had no adequate simple means for preventing it.

The machine forming the subject matter of this application does most effectively dispel practically all of this occluded air and gas from the mass of corn during treatment, so that completely filled cans do not show any appreciable head space due to this cause.

Of course, all food products put in cans in a heated condition are more or less in an expanded state and will naturally shrink to less bulk when cold.

The canner depends on this natural shrinkage from a hot to a cold condition in the hermetically sealed container to produce the desired vacuum in the finished product, which will tend to hold the ends of the cans in a concave position during handling and transporting. This is a very necessary condition to attain and maintain.

The general public have been taught that a can with bulged ends may be the result of spoiled contents, and will hesitate to purchase "swelled cans" as they are generally termed. A swelled can does not necessarily mean a spoiled can.

If corn is heated and placed in cans and sealed without dispelling the occluded air and gas, this air and gas will finally be expelled from the mass during sterilization so that when it cools it will occupy the head space in the can and tend to partially relieve the vacuum formed through shrinkage. Its presence in the head space also tends to have a catalytic action promoting thereby chemical changes and reactions, which result in the discoloration of the food product or in the production of additional gas until the entire vacuum will be relieved by the gases so generated within the sealed container. In some food products this process will continue until a pressure is created sufficient to bulge the ends, or at least to a point where no vacuum remains to help hold them in a concave position. A case of canned goods in this condition may have all of the ends concave and a careless truckman may drop the case on his truck with sufficient force to cause the contents of each can to become a temporary propellent and thus drive the lower ends of the cans into convex positions so they will all look like swells.

After the ends are once forced out in this convex position they will not spring back of their own accord and to all external appearances are spoiled goods, when as a matter of fact they may be perfectly good.

The foregoing explains the almost absolute necessity of getting practically all of this occluded air and gas out of the treated corn before it enters the can.

The combined action in this invention, of the beaters or agitators moving in a vertical plane that beat the mass when they enter and lift it when they emerge, together with the to and fro movement imparted to the mass due to the alternately inclined faces of the beater blades and the stirring action of the high pressure steam jets projected downwardly into the mass all conduce to drive the last particle of air and gas from the mixture before it is discharged from the machine, resulting in a product that is practically free from occluded air and gas and which will not shrink in the cans more than the natural shrinkage due to the contraction of cooling, which is a necessary and desirable condition to produce the vacuum in the cans to help hold the ends concave during the periods of rough handling or jolting in transportation.

Having thus described my invention what I claim as new and desire to secure by Letters Patent is:

1. An apparatus for treating green corn for canning purposes comprising a chamber having a curved bottom and into which a quantity of green corn may be placed for treatment, a source of syrup or brine supply, alternately inclined beater blades located within said chamber and mounted for rotation in spaced relation with the bottom of said chamber, said blades being mounted on a horizontal shaft, pipes located in said chamber and conforming to the contour of the bottom thereof, perforations in said pipes pointing toward the bottom and side walls of said chamber whereby steam under pressure may be admitted to said chamber, said steam and beater blades coacting to intermix, stir and agitate a mass of syrup and green corn within said chamber to remove any occluded air or gas from the mass with means for then discharging said treated mass.

2. An apparatus for treating green corn for canning purposes comprising two chambers united to form a unitary structure and each having a curved bottom into which a quantity of green corn may be placed for treatment, a single source of syrup or brine supply for both of said chambers, alternatingly inclined beater blades located within each chamber and mounted for rotation in spaced relation with the curved bottoms of said chambers, said blades being mounted on horizontal shafts, pipes located in said chambers and conforming to the bottoms thereof, perforations in said pipes pointing to the bottom and side walls of said chambers and conforming to the contours of said bottoms, perforations in said pipes pointing toward the bottoms and side walls whereby steam under pressure may be admitted to said chambers, said steam and said beater blades coacting to intermix, stir and agitate a mass of green corn and syrup within said chambers to remove any occluded air or gas from the mass with means for then discharging said treated masses separately or together.

In testimony whereof I affix my signature.

OGDEN S. SELLS.